United States Patent Office 3,734,890
Patented May 22, 1973

3,734,890
PROCESS TO PRODUCE OILLESS ALKYDS
Thomas M. Powanda, Middlesex, N.J., assignor to
Celanese Corporation, New York, N.Y.
No Drawing. Continuation of abandoned application Ser. No. 796,575, Feb. 4, 1969. This application Apr. 8, 1971, Ser. No. 132,365
Int. Cl. C08g 17/04, 17/15
U.S. Cl. 260—75 R   4 Claims

ABSTRACT OF THE DISCLOSURE

An improved process for producing an oilless alkyd capable of providing superior coating compositions which comprises producing an interpolymer, being substantially free of gelation by the reaction of a polyol having 3 to 4 hydroxyl functional groups, an aliphatic diol having 5 to 7 carbon atoms and a phthalic anhydride component in the presence of a catalytic amount of dialkyl stannic oxide wherein each alkyl group can contain from 1 to 6 carbon atoms.

---

This is a continuation of U.S. Ser. No. 796,575 filed Feb. 4, 1969, now abandoned.

This invention relates to an improved process for producing oilless alkyds wherein the coatings are characterized by improved flexibility, chemical resistance, adhesion, and significantly higher surface hardness over the generally acceptable conventional alkyds.

The generally acceptable conventional alkyds are essentially composed of polyols, aromatic dibasic acids and an aliphatic monobasic long chain unsaturated fatty acid and are utilized to prepare film coatings for such uses as baking enamels for equipment machinery, appliances, strip and coil coatings and the like. The known disadvantages of the conventional alkyds are poor color retention, aged hardness or brittleness of film coatings occurring over a period of time and it is generally believed that these disadvantages are caused by the air oxidation of the unsaturated bonds of the long chain fatty acid of the conventional alkyds which are required to provide a coating having the desired flexibility. Furthermore, conventional alkyds containing more than 40 percent aromatic dibasic acids, especially phthalic anhydride, do not provide coatings having acceptable properties such as flexibility, chemical resistance, hardness and the like. In the formulation of polyesters based upon phthalic anhydride as the acid component, it is known that resins containing 20 percent phthalic anhydride and moieties of polyfunctional alcohols such as glycerine, pentaerythritol, or trimethylolpropane, whether these are used singly or in combination, are soft and lacking in mar resistance. On the other hand, resins of this type containing about 40 percent phthalic anhydride are highly brittle and lack adhesion.

An improved process has been discovered to produce oilless alkyds, i.e., alkyds without the long chain fatty acids, which provide superior coatings in regard to flexibility, chemical resistance, adhesion, among others, utilizing phthalic anhydride contents in excess of 40 weight percent. These oilless alkyds comprise an interpolymer of a polyol having 3 to 4 hydroxyl functional groups, an aliphatic diol having 5 to 7 carbon atoms and a phthalic anhydride component. The interpolymer, as produced, is substantially free of gelation.

The process of this invention is carried out by the reaction of the polyol, aliphatic diol and phthalic anhydride in the presence of a catalytic amount of a dialkyl stannic oxide under temperature conditions which provide esterification of the reacting materials.

The dialkyl stannic oxide catalysts are also known as dialkyl tin oxide. These catalysts contain alkyl groups wherein each alkyl radical can contain from 1 to 6 carbon atoms. Typical of the catalysts are dimethyl stannic oxide, diethyl stannic oxide, dibutyl stannic oxide, dihexyl stannic oxide, and the like. The preferred catalyst is dibutyl stannic oxide. The amounts of catalyst can range from about 0.05 to about 5% by weight of the total composition, preferably from about 0.1 to about 1 weight percent.

The temperature conditions for the reaction can range from about 100° C. to 250° C., if necessary.

The polyols which can be utilized can include glycerine, pentaerythritol, trimethylolpropane, among others. The aliphatic diol which can be utilized include pentanediol, hexanediol and heptanediol and particularly preferred is 1,6-hexanediol. The phthalic anhydride component can include phthalic acid, iso-phthalic acid, as well as phthalic anhydride.

The amounts of polyols in the interpolymer can range from about 2.5 to 25 weight percent, preferably from about 5 to 20 weight percent based on the total interpolymer. The aliphatic diol can range in amounts from about 25 to 45 weight percent, preferably from about 30 to 40 weight percent based on the total interpolymer. The phthalic anhydride component can range from about 45 to 65 weight percent, preferably from about 50 to 60 weight percent based on the total interpolymer. It is recognized, of course, that the total amount of components will not exceed 100 weight percent. Curable compositions can be produced utilizing the oilless alkyds of this invention in combination with amino resins to produce outstanding films. Typical of amino resins are those falling in the class of urea-formaldehyde and melamine-formaldehyde condensation products which are well known in the art. Particularly preferred amino resins are the alkoxymethyl melamines containing from 3 to 6 alkoxymethyl groups and the alkyl radicals contain from 1 to 6 carbon atoms. The amounts of the amino resins in these curable compositions can range from about 5 weight percent to about 50 weight percent with the remainder being the interpolymer as heretofore described.

The interpolymers of this invention are particularly useful in the preparation of alkyds, urethans, epoxies, laminating resins, waxes, flame retardants, and the like.

The following examples will serve to illustrate the invention hereinabove described without limiting the same.

EXAMPLE I

In a reaction vessel is placed 116 grams pentaerythritol, 452 grams 1,6-hexanediol, and 631 grams phthalic anhydride. Nitrogen is passed over the reactants to replace available air and heat is applied. The esterification reaction is run at a temperature not exceeding 234° C. over a 7-hour period. During this period 76.8 grams of water are removed. After the reaction is completed, the reaction product is cooled and a sufficient amount of butanol/xylol solvent (50/50) is added to provide an oilless alkyd having 60 percent solids substantially free of gelation having the following properties:

solids=60.1% ±1%
viscosity=720 centipoises
acid number=3.2
color=−1 (Gardner)

In a reaction vessel is placed 116 grams pentaerythritol, 452 grams 1,6-hexanediol, 631 grams phthalic anhydride and 6 grams dibutyl tin oxide (stannic oxide). Nitrogen is passed over the reactants to replace the available air and heat is applied. The esterification is run at temperatures not exceeding 239° C. over a 5-hour period. During this period 81 grams of water are removed. After the reaction is completed, the reaction product is cooled and sufficient amounts of butanol/xylol solvent (50/50) is added to provide an oilless alkyl having 60 percent solids substantially free of gelatin having the following properties:

solids=60.4%±1%
viscosity=470 centipoises
acid number=2.5
color=1½ (Gardner)

The outstanding properties of the films made with the oilless alkyd of Example 1 and hexamethoxymethyl melamine are similar with the properties of the films made with the oilless alkyd of Example 2 and hexamethoxymethyl melamine. It should be noted however that the oilless alkyd of Example 2 required less time for its completed reaction utilizing dibutyl stannic oxide as the catalyst than the oilless alkyd of Example 1.

It is to be understood that the foregoing description is merely illustrative of preferred embodiments of the invention of which many variations may be made by those skilled in the art within the scope of the following claims without departing from the spirit thereof.

I claim:
1. An oilless alkyd resin comprising:
   an interpolymer of monomers consisting essentially of:
   (1) pentaerythritol used in an amount between about 2.5 percent and about 25 percent by weight based on the total weight of the interpolymer;
   (2) a straight-chain aliphatic diol having between 5 and 7 carbon atoms and selected from the group consisting of pentanediol, hexanediol, and heptanediol, said aliphatic diol being used in an amount between about 25 percent and about 45 percent by weight based on the total weight of the interpolymer; and
   (3) phthalic anhydride in an amount between about 45 percent and about 65 percent by weight of the interpolymer; said interpolymer having been
   polymerized in the reactive presence of between about 0.05 and about 5 percent by weight based on the total weight of the composition of a dialkyl stannic oxide catalyst wherein the alkyl substituents contain between 1 and about 6 carbon atoms.

2. The oilless alkyd resin of claim 1 wherein the pentaerythritol is used in amounts ranging from about 5 to about 20 weight percent, the aliphatic diol is used in amounts ranging from about 30 to 40 weight percent, phthalic anhydride is used in amounts ranging from about 50 to about 60 weight percent and the dialkyl stannic oxide catalyst is used in amounts ranging from about 0.1 to about 1 weight percent, the weight percent being based on the total weight of the composition.

3. The oilless alkyd resin of claim 2 wherein the aliphatic diol is 1,6-hexanediol.

4. The oilless alkyd resin of claim 3 wherein the catalyst is dibutyl stannic oxide.

References Cited
UNITED STATES PATENTS

| | | | |
|---|---|---|---|
| 1,897,260 | 2/1933 | Kienle et al | 260—75 |
| 3,108,089 | 10/1963 | Ferstandig | 260—75 |
| 3,157,618 | 11/1964 | Le Bras | 260—75 |
| 3,161,618 | 12/1964 | Kreps et al. | 260—75 |
| 3,345,339 | 10/1967 | Parker et al. | 260—75 |

FOREIGN PATENTS 577,788   6/1959   Canada.

MELVIN GOLDSTEIN, Primary Examiner

U.S. Cl. X.R.

260—850

UNITED STATES PATENT OFFICE
CERTIFICATE OF CORRECTION

Patent No. 3,734,890           Dated    May 22, 1973

Inventor(s)   THOMAS M. POWANDA and THOMAS BAILEY

It is certified that error appears in the above-identified patent and that said Letters Patent are hereby corrected as shown below:

In column 1, in the heading, please insert

-- THOMAS BAILEY -- as co-inventor.

Signed and sealed this 17th day of September 1974.

(SEAL)
Attest:

McCOY M. GIBSON JR.
Attesting Officer

C. MARSHALL DANN
Commissioner of Patents